Nov. 7, 1939.  C. E. STARR  2,178,900
SPEED CHANGE AXLE AND MEANS FOR OILING THE SAME
Filed April 13, 1936   2 Sheets-Sheet 1
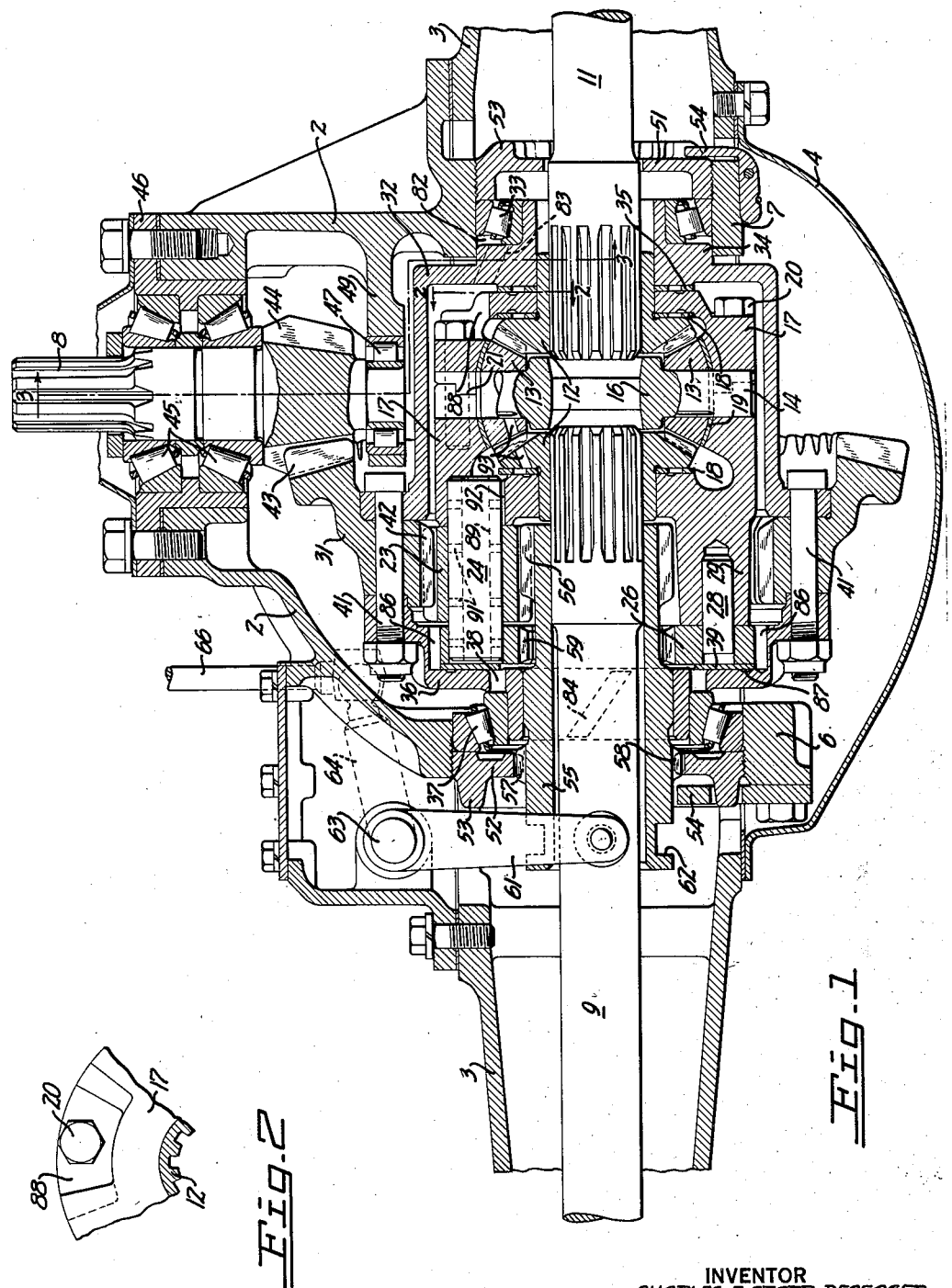
INVENTOR
CHARLES E. STARR, DECEASED.
BY EVA M. STARR, ADMINISTRATRIX.
BY Charles S. Evans
HER ATTORNEY

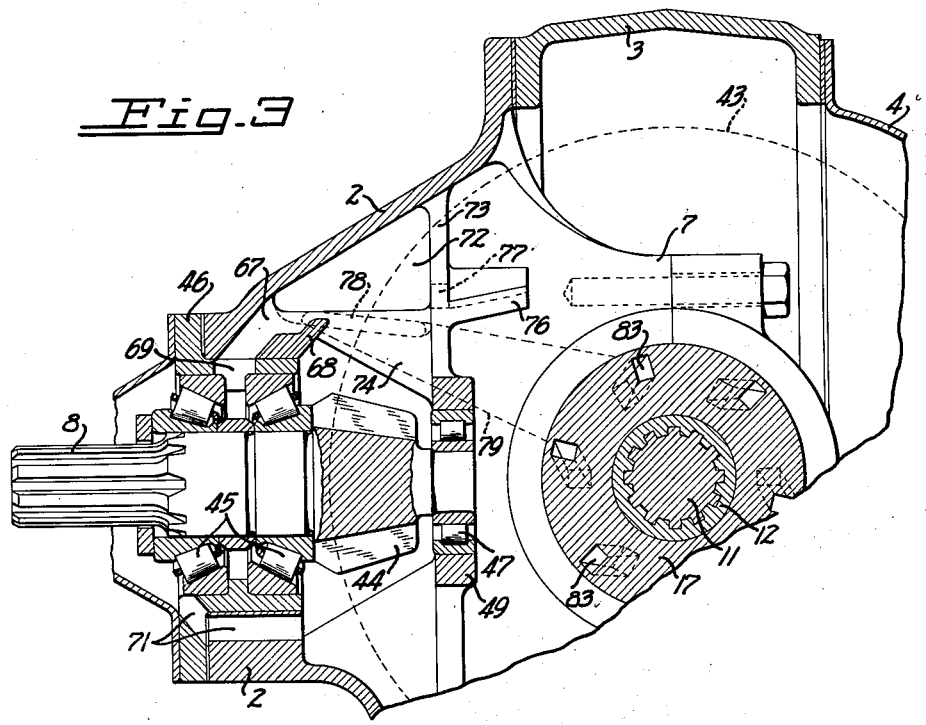

Patented Nov. 7, 1939

2,178,900

UNITED STATES PATENT OFFICE 2,178,900

SPEED CHANGE AXLE AND MEANS FOR OILING THE SAME

Charles E. Starr, deceased, late of Inglewood, Calif., by Eva M. Starr, administratrix, Inglewood, Calif., assignor to Perfecto Gear Differential Co., Bellingham, Wash., a corporation of Washington Application April 13, 1936, Serial No. 74,132

11 Claims. (Cl. 184—11)

This is a continuation in part of a co-pending application, Serial No. 11,033, filed March 14, 1935.

The invention relates to rear axles for motor vehicles, and more particularly to axles embodying combined differential and planetary gear systems.

One of the objects of the invention is to provide an improved system for oiling the mechanism, whereby a circulation of oil is maintained thru the rotor which incloses the gear system.

Another object of the invention is to provide means for feeding oil to the drive shaft bearings.

The invention possesses other objects and features of advantage, some of which, with the foregoing, will be set forth in the following description of the invention. It is to be understood that the invention is not limited to this disclosure of species of the invention, as variant embodiments thereof within the scope of the claims may be adopted.

Referring to the drawings:

Figure 1 is a horizontal sectional view of an axle embodying the improvements of the invention.

Figure 2 is a fragmentary vertical sectional view showing one of the oil inlet passages in the differential casing, taken in a plane indicated by the line 2—2 of Figure 1.

Figure 3 is another detailed vertical sectional view showing the oil feed to the drive shaft bearing and to the rotor, and also showing the oil inlet passages in the end of the rotor; the plane of section is indicated by the line 3—3 of Figure 1.

Figure 4 is an elevational view looking at the inside of the housing portion which carries the drive shaft. The rotor is omitted from this view to disclose the housing construction more clearly, but the master gear is included by dotted lines to indicate its position with respect to the internal portions of the housing.

In terms of broad inclusion, the speed change axle embodying the invention comprises a housing for holding oil, a hollow rotor in the housing for enclosing the gears, and means for feeding oil from the housing into a rotor. Preferably a continuous circulation of oil is maintained from the housing thru the rotor during operation of the axle. The means for circulating the oil preferably comprises a pocket in the housing for receiving oil thrown by a rotatable element, such as the master gear, which runs in the oil. This pocket is positioned above the rotor axis, and the oil from the pocket is fed by gravity thru a passage into the end of the rotor. Means are preferably provided in the rotor for forcing circulation of the oil thru the rotor. Means are also provided for feeding oil to the drive shaft bearings.

In greater detail, and referring particularly to the drawings, the speed change axle embodying the invention comprises a specially constructed housing portion 2 adapted for mounting on the inner side of the ordinary axle housing 3 of an automobile. A cover plate 4 is also provided over the outer side of the housing 3 in the usual manner. The housing portion 2 is designed to carry the entire mechanism embodying the invention, and for this purpose is provided with a pair of annular end brackets 6 and 7 positioned within and in axial alignment with the axle housing 3. Drive shaft 8 which connects with the propeller shaft, projects into the housing portion 2; and the axle shafts 9 and 11 project into the housing portion 2 thru the annular supporting brackets 6 and 7. The housing also provides a reservoir for holding lubricating oil.

A differential gear system is provided within the housing for connecting the axle shafts together. This system comprises a pair of differential gears 12 mounted on the opposing ends of the axles and connected by differential pinions 13 journaled on the arms 14 of a spider 16. The core of the spider is annular in shape to provide a central opening for clearing the ends of the axle, so that the latter are free to project into the core if axial adjustment is necessary. The differential assembly is enclosed in a casing 17 journaled on the hubs of gears 12 with suitable bearing plates 18 interposed between the casing and the gears.

The differential casing 17 is split transversely along the axis of the differential pinion, and the casing is provided with suitable sockets for receiving the arms 14 of the spider. Bearing plates 19 are also preferably provided between the differential pinions 13 and the casing. Suitable studs 20 hold the two halves of the casing together, with the spider arms clamped therebetween. The two halves of the casing are preferably machined to provide an offset portion 21, so that the sections are interlocked when fitted together.

A planetary gear system is also provided, connected with the differential gear system, and comprises planet pinion 23 journaled on a shaft 24. One end of the pinion shaft 24 is preferably journaled in the differential casing 17, and the other end is preferably journaled in a bearing ring 26 encircling the axle shaft 9. Preferably several planetary pinions are provided. At points intermediate the pinions the bearing ring 26 is fastened to the differential casing as by pin 28 anchored in a lug portion 29 of the casing structure.

A rotor is provided for encasing both gear systems, and comprises an annular central portion 31 encircling the planetary pinion 23. The rotor also comprises a bell shaped end portion 32 surrounding the differential system and journaled at its outer end in a bearing 33 held by the bracket 7. This end of the rotor is also provided with a reduced annular portion 34 rotatably fitted in the bracket 7 to provide an oil seal. The hub of the differential gear 12 is also journaled in this end of the rotor, and a bearing plate 35 is preferably interposed between the rotor and the differential casing 17.

The other end of the rotor also comprises a bell-shaped portion 36 journaled at its outer end in a bearing 37 held by the housing bracket 6. Bearings 33 and 37 in which the ends of the rotor are journaled comprise the main bearings of the unit, and apertures 38 are preferably formed in the end portion 36 for knocking out bearing 37. End portion 36 of the rotor embraces the outer end of the pinion shaft 24 and provides a journal for the bearing ring 26, and a bearing plate 39 is preferably interposed between these elements. Rotor sections 31, 32 and 36 are preferably secured together by bolts 41 extending thru the central rotor portion 31 and thru suitable flanges provided on the end sections 32 and 36; the flanges being preferably seated in annular recesses provided in the central portion to increase the rigidity of the unit when assembled.

Suitable teeth are preferably integrally formed on the inside of the central rotor section 31 to provide the ring gear 42 for the planetary system. This gear is meshed with the planet pinion 23, as shown in Figure 1. Suitable teeth are also integrally formed on the outside of the central rotor section 31 to provide the master gear 43. By this arrangement the driving stress is transmitted from the master gear 43 to the ring gear 42 thru the integrally formed one-piece rotor section 31, and weakness due to the separated elements is avoided.

Means are provided for rotating the rotor. For this purpose a driving pinion 44 is provided on the drive shaft 8 and is meshed with the master gear 43. The drive shaft 8 is journaled in the housing in bearings 45 carried by a collar 46 bolted to the end of housing portion 2. Additional support is provided for the driving pinion by a bearing 47 surrounding the inner projected end of the drive shaft and mounted in a bracket 49 formed in the housing portion 2. By this drive arrangement the rotor carrying the ring gear 42 is rotated to drive the planet pinion 23.

Adjustable means are provided for tightening the bearings 33 and 37 of the rotor. For this purpose annular retaining or holding rings 51 and 52 are threaded in the outer ends of the brackets 7 and 6 respectively. These retaining rings encircle the axle shafts, and are provided with lugs 53 with which a suitable tool may be engaged for tightening the bearings. Locking plates 54 are provided for engaging the lugs of the holding rings for fixing the latter in a selected position of adjustment. As shown in Figure 1, the retaining ring 51 extends inwardly to provide a relatively close fit with the axle 11.

The purpose of this close clearance is to permit the ring 51 to also function as an oil retaining ring. If desired a packing may additionally be provided between the retaining ring 51 and the axle shaft 11.

Means are provided for cutting the planetary system into and out of the drive. For this purpose a sleeve 55 is slidably mounted within the rotor portion 36 and on the axle shaft 9, so that the sleeve also provides an oil seal for this end of the rotor. The sleeve projects thru the bearing ring 26 and has teeth formed on its inner end meshed with the planet pinion to provide the sun gear 56 of the planetary system. Teeth 57 are also formed on the inside of the holding ring or fixed element 52, and complementary teeth 58 are formed on the sleeve 55 to mesh with the teeth 57 of the fixed element.

When these clutch teeth are meshed, as shown in Figure 1, the sleeve 55 and consequently the sun gear 56 is held against rotation, and the pinion 23 is caused to planetate about the sun gear when the ring gear 42 is being driven. Under these conditions the differential casing 17 is caused to rotate with respect to the ring gear, and at a reduced speed.

Suitable teeth 59 are also formed on the inside of the bearing ring 26 with which the teeth of the sun gear 56 may be meshed upon outward shifting of the sleeve. When the sleeve is shifted outwardly the teeth 58 move out of engagement with the teeth 57, so that sleeve 55 is free to rotate at the time the sun gear is meshed with the bearing ring 26. Under these conditions the planet pinion 23 is prevented from rotating about its own axis, and the differential casing 17 and ring gear 42 are locked together for rotation as a unit. This gives a speed which is higher than that when the planetary system is functioning.

Means are provided for shifting the sleeve to optionally engage it with either fixed element 52 or bearing ring 26. The shifting mechanism comprises a yoke 61 engaging an annular groove 62 in sleeve 55. The yoke is mounted on a shaft 63 journaled in the housing, and the shaft is provided with a crank 64 connected with a suitable shifting lever in the driver's compartment by a connecting rod 66.

The oiling system, which is the principal feature of the invention, embodies means for feeding oil to the drive shaft bearings 45 and also embodies means for feeding oil to the mechanism inside the rotor which encases the gear systems. As shown in Figure 3, the oil feed to the drive shaft bearings 45 comprises an oil pocket 67 formed by a lip 68 in the housing and arranged to receive oil from the housing. This pocket collects oil thrown by a rotatable element running in the oil, such as the master gear 43, and also collects oil splashed against and draining down the inclined upper wall of the housing portion 2. The lower end of pocket 67 drains downwardly into bearings 45 thru a passage 69 in the upper portion of the bearing collar 46, and then drains back into the main body of the housing thru passages 71 (shown slightly out of position in Figure 3) formed in the lower portion of the collar 46 and the housing portion 2. This arrangement provides a continuous circulation of oil thru the drive shaft bearings.

The other component of the oiling system, namely that which feeds oil thru the rotor, also embodies a gravity flow. As shown in Figures 3 and 4, a second oil pocket 72 is formed in the housing portion 2 adjacent the master gear 43.

The inner side of this oil pocket is formed by the supporting web 73 of the bearing bracket 49; while the bottom of the pocket is formed by an inclined web 74 positioned behind the web 73 and sloping downwardly toward the side wall of the housing. As shown in Figure 3, this arrangement leaves a triangular opening alongside the master gear 43, and into which oil from the master gear and driving pinion may be thrown. Additional oil is collected from the master gear by an inclined trough 76 projecting forwardly from the web 73. Oil collected by this trough drains into the pocket through a suitable aperture 77 provided in web 73.

Oil received by pocket 72 passes thru an opening 78 in the wall of the housing, and then flows downwardly thru an inclined passage 79 which terminates in an opening 81 in the inner surface of bracket 7. See Figure 4. This opening is arranged to discharge the oil into the space 82 between the end of rotor portion 32 and its bearing 33. See Figure 1. The oil thus collected lubricates bearing 33 and is retained in large measure in the region about this bearing by the retaining ring 51.

From this point the oil feeds into the rotor thru a series of inlet passages 83 communicating with the interior of the rotor and opening out into the space 82 in the bracket 7. These passages slope upwardly to clear the bearing ring 35, and are also inclined to the axis of the rotor to give a forced feed of the oil into the rotor. In other words, the inclined walls of these passages function as impellers to give a pump action for drawing the oil into the rotor.

A part of the oil flowing into the rotor passes along the outside of the differential casing 17 and feeds into the teeth of the ring gear 42 and planet pinion 23, and also lubricates the sun gear 56 and clutch teeth 59. This oil collects in the bottom of the rotor, and after reaching the level of the axle shafts it feeds out into the main body of the housing thru a passage 84 formed by a groove cut between the rotor portion 36 and the sleeve 55. This outlet passage is also preferably inclined to the axis of the rotor to give a pump action for feeding the oil out of the rotor. The effect therefore is to give forced circulation of the oil thru the rotor.

The bearing ring 26 which supports the outer end of the pinions is lubricated by grooves 86 cut in the rotor and extending inwardly along the periphery of the bearing ring. Oil grooves 87 are also preferably provided in the rotor behind the bearing plate 39. Similar grooves are also preferably provided in the surfaces behind plates 18 and 35.

As best shown in Figures 1 and 2, an oil inlet passage 88 is provided in the differential casing 17, so that oil from the rotor may pass into the differential gear system. Preferably several of these openings are provided about the circumference of the differential casing. These passages are also inclined to the axis of the casing, so that oil is drawn into the casing by forced feed. Figure 2 shows the inclined walls of these passages. After entering the differential casing, the oil flows about the differential gears and pinions and finally passes out thru a longitudinal passage 89 in the differential pinion shaft. From this central passage the oil flows to the bearing surfaces of the pinion shaft thru transverse passages 91. A groove 92 in the differential casing and extending alongside the pinion shaft also assists in lubricating the bearing surface in the casing. Oil holes 93 are also preferably provided in the differential gear 12 and pinions 13, to assist in lubricating these parts.

The flow of oil out thru the end of the pinion shaft is restricted by the close clearance between this end of the shaft and the bearing plate 39. This restricted outlet backs the oil up in the differential casing and insures that the parts are well lubricated. There is a gradual circulation thru the differential casing however, and as the oil works out of the casing it combines with the oil circulating thru the rotor outside of the casing and finally passes out the tail end of the rotor thru the passage 84. The oil is thus returned to the main body of oil in the housing, where it may again be picked up by the rotating parts and redeposited in the oil pocket for recirculation thru the rotor.

What is claimed is:

1. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, means for feeding oil from the housing into the rotor, a passage in the differential casing for admitting oil from the rotor into said casing, and a passage in the pinion shaft and communicating with the interior of said casing for directing oil to the bearing surfaces on said shaft.

2. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, means for feeding oil from the housing into the rotor, a passage in the differential casing for admitting oil from the rotor into said casing, said passage being inclined to the casing axis to force the oil into the casing, and a passage in the pinion shaft and communicating with the interior of said casing for directing oil to the bearing surfaces on said shaft.

3. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, a bearing ring for supporting the other end of the pinion shaft and journaled in the rotor, means for feeding oil from the housing into the rotor, a passage in the rotor for directing oil to the peripheral portions of the bearing ring, a passage in the differential casing for admitting oil from the rotor into said casing, and a passage in the pinion shaft and communicating with the interior of said casing for directing oil to the bearing surfaces on said shaft.

4. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, a bearing ring for supporting the other end of the pinion shaft and journaled in the rotor, means for feeding oil from the housing into the rotor, a passage in the rotor for directing oil to the peripheral portions of the bearing ring, a passage in the differential casing for admitting oil from the rotor into said casing, a longitudinal passage extending thru the pinion shaft and communicating with the interior of the casing, the outer end of the pinion shaft being positioned adjacent the rotor to restrict the flow of oil out of the shaft, and transverse passages in the pinion shaft for directing oil to the bearing surfaces on said shaft.

5. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, a sleeve journaled in the end of the rotor adjacent the planet pinion, means for feeding oil from the housing into the opposite end of the rotor, and a passage between the rotor and said sleeve for returning the oil from the rotor to the housing.

6. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, a rotor encasing said gear systems and journaled in the housing, a sleeve journaled in the end of the rotor adjacent the planet pinion, means for feeding oil from the housing into the opposite end of the rotor, and a passage between the rotor and said sleeve and inclined to the axis of the rotor for returning the oil from the rotor to the housing.

7. A speed change axle comprising a housing for holding oil, a pair of axle shafts in the housing, a differential gear system connecting the shafts and having a differential casing, a planetary gear system connected with said differential system, a rotor encasing said gear systems and journaled in the housing, a passage for admitting oil from the housing into the rotor, a passage adjacent one end of the casing for admitting oil from the rotor into the casing, an outlet passage adjacent the other end of the casing for returning the oil from the casing back to the rotor, and an outlet passage for returning oil from the rotor back to the housing.

8. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, means for feeding oil into the differential casing, and an outlet passage through the pinion shaft for discharging oil from the casing.

9. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, means for feeding oil into the differential casing, an outlet passage through the pinion shaft for discharging oil from the casing, and a transverse passage in the pinion shaft for directing oil to the bearing surfaces on said shaft, said outlet passage being restricted at its outer end to prevent the oil from running freely out of the shaft.

10. A speed change axle comprising a housing for holding oil, a pair of axle shafts in the housing, a differential gear system connecting the shafts, a planetary gear system connected with the differential gearing and comprising a planetary pinion, a shaft for the pinion and having an end mounted on the differential casing, a passage for admitting oil from the rotor into the casing, a passage in the pinion shaft for directing oil from the casing to the bearing surfaces on said shaft, and means for forcing oil under pressure into the rotor.

11. A speed change axle comprising a housing for holding oil, a pair of axle shafts in the housing, a differential gear system connecting the shafts and having a differential casing, a planetary gear system connected with the differential gearing and comprising a planet pinion, a shaft for the pinion and having an end mounted on the differential casing, means for feeding oil under pressure into the differential casing, an outlet through the pinion shaft for discharging oil from the casing, and a transverse passage in the pinion shaft for directing oil to the bearing surfaces on said shaft, said outlet passages being restricted at its outer end to build up the oil pressure in the casing and in said pinion shaft.

EVA M. STARR,
*Administratrix of the Estate of Charles E. Starr, Deceased.*